UNITED STATES PATENT OFFICE.

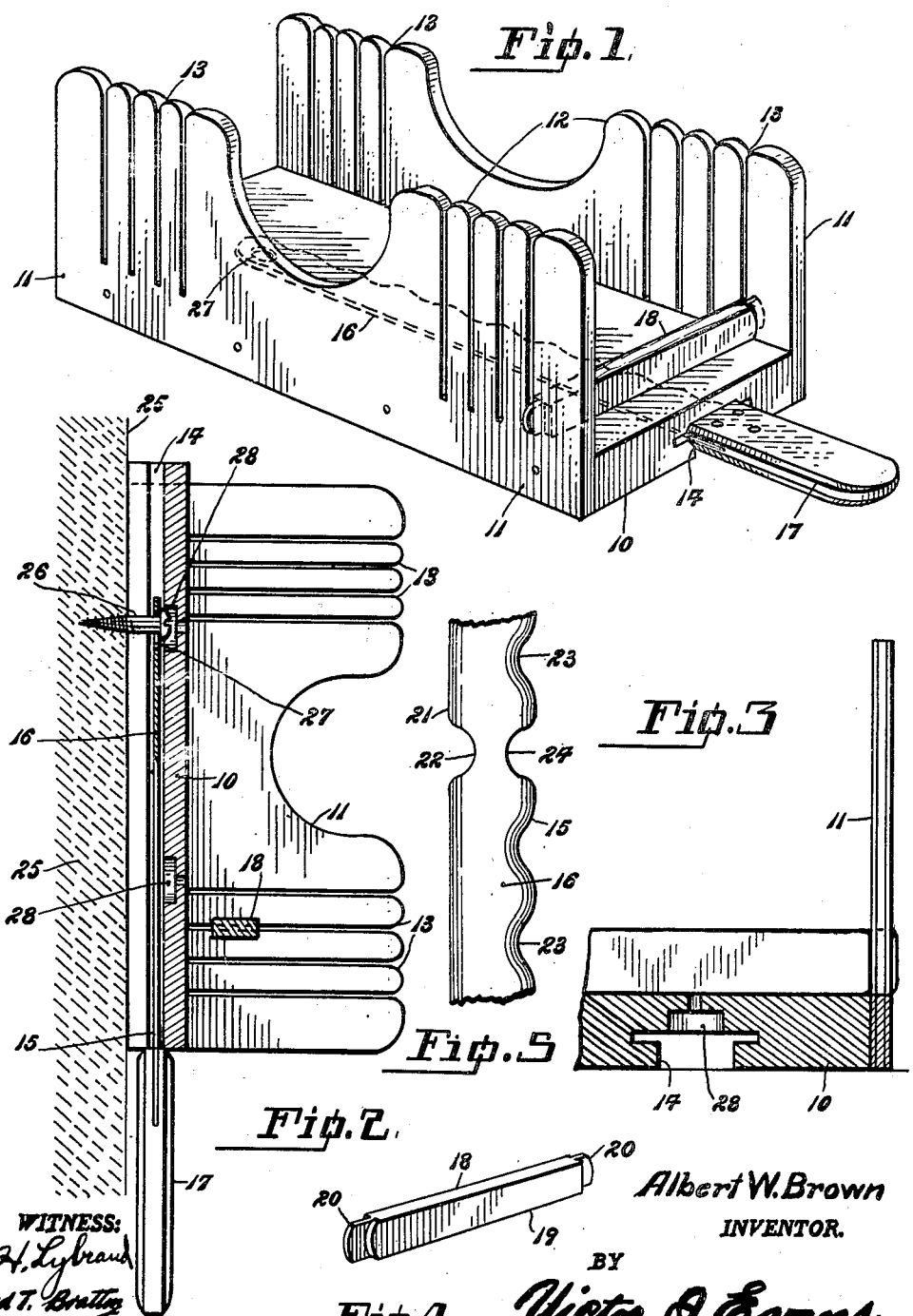

ALBERT W. BROWN, OF MAYS LANDING, NEW JERSEY.

BREAD-SLICER.

1,371,849.   Specification of Letters Patent.   Patented Mar. 15, 1921.

Application filed July 15, 1919. Serial No. 310,901.

*To all whom it may concern:*

Be it known that I, ALBERT WALTER BROWN, a citizen of the United States, residing at Mays Landing, in the county of Atlantic and State of New Jersey, have invented new and useful Improvements in Bread-Slicers, of which the following is a specification.

The invention relates to kitchen implements and utensils and has for an object to provide a device for slicing bread, cake or other forms of pastry or eatables.

The invention comprehends among other features the provision of a slicing board including suitable means for gaging the thickness of the slices to be cut from a loaf of bread or the like, together with a knife adapted for the slicing operation with means for conveniently disposing the knife in an out of the way position when the slicer is not in use, so that the slicer and knife can be conveniently supported upon a wall or the like in a position so that it can be readily removed for use when desired.

In the further disclosure of the invention reference is to be had to the accompanying drawings, constituting a part of this specification, in which similar characters denote corresponding parts in all the views, and in which,—

Figure 1 is a perspective view of the slicer.

Fig. 2 is a vertical sectional view taken through the slicer, a portion of the blade being shown in fragmentary section.

Fig. 3 is a fragmentary vertical transverse sectional view taken through the slicer.

Fig. 4 is a perspective view of the gage, and

Fig. 5 is a face view of a portion of the blade.

Referring more particularly to the views, the numeral 10 indicates a slicing board which has suitable sides 11 provided with a series of uprights 12 formed by saw-cuts 13 in the sides. The underside of the board 10 is formed with a longitudinal groove 14 of a cruciform nature in cross section, and is adapted to receive a knife 15 including a blade 16 and handle 17, the knife being slid into the groove 14 when not in use. A gage 18 is provided, consisting of a main body portion 19 having ears 20 on the ends thereof, which is adapted to be slid into the saw-cuts 13 as shown in Fig. 1.

It will be seen that in the use of the device, a loaf of bread may be disposed upon the slicing board 10 and the knife disposed in one of the saw-cuts on each side with the gage 18 arranged adjacent to the knife in the next set of saw-cuts, so that when the loaf of bread is pushed up against the gage, thus traversing the path of the knife, and the knife brought down into cutting contact with the bread, a slice of bread will be cut from the loaf and which slice will be of the thickness equivalent to the distance between the gage and the vertical path of movement of the knife. It will be noted that the uprights 12 are suitably rounded off at their tops and that the blade 16 of the knife is formed along one edge 21, with a notch 22 and that although most of the cutting notches 23 of the opposite edge are for cutting purposes, one of said notches 24 has a blunt edge. These notches 22, 24 are provided so that in applying the knife to the sides of the slicing board to ride in the saw-cuts thereof, one of the notches 22, 24, depending upon which the cutting edge of the knife is used, will register with the saw-cuts of one of the sides and thus prevent the cutting or nicking of the uprights along their upper edges.

When not in use, the slicer is adapted to be supported on a suitable wall 25 by means of a headed screw or other similar device 26, which is driven into the wall and it will be seen that the knife is provided with an opening 27 and the underside of the board in the groove 14 has one or a plurality of recesses 28. Now when the knife is slid into the groove, the opening 27 of the knife will come into registration with one of the recesses 28 in the board and then when the board is placed against the wall, the head of the screw will pass through the opening of the knife and extend into the recess 28 with which the opening of the knife registers, so that the knife and board will be simultaneously supported by a single supporting element, namely the screw 26. It will also be apparent, as clearly indicated in Figs. 1, 2, that in disposing the knife of the fashion mentioned, in the groove in the underside of the slicing board, the handle of the knife acts as a handle for the slicing board, thus permitting of the ready disposal of the board and knife in supporting position, as shown in Fig. 2, and the ready removal thereof, from the supporting position.

From the foregoing description, it will be clearly seen that the device described is of a simple construction, consisting of few parts and therefore can be cheaply manufactured, and will effectively accomplish the desired result.

Having described my invention, I claim,—

1. In a bread slicing device and a bread cutting knife therefor, the combination with a body provided with a longitudinal groove having a cross opening, of a blade constituting a part of the knife and provided with a cut out portion adapted to register with the cross opening when the blade is disposed in the groove and a support adapted to be received in the cross opening to pass through the groove and cut out portion of the blade for holding said blade in said groove and simultaneously supporting said device when the same is not in use.

2. In a device of the character described the combination with a bread receiving body having a cross opening and a bread cutting knife provided with a cut out portion and adapted for disposal in the body when the same is not in use and a support for reception in the cross opening to support the body and simultaneously pass through the cut out portion of the blade to hold the same in engagement with the body.

In testimony whereof I affix my signature.

ALBERT W. BROWN.